United States Patent [19]
Paleari et al.

[11] Patent Number: 6,063,417
[45] Date of Patent: *May 16, 2000

[54] CHEESE PACKAGING FILM

[75] Inventors: Mario Paleari; Fabio Barbaglia, both of Milanese, Italy

[73] Assignee: Cryovac, Inc., Duncan, S.C.

[*] Notice: This patent issued on a continued prosecution application filed under 37 CFR 1.53(d), and is subject to the twenty year patent term provisions of 35 U.S.C. 154(a)(2).

[21] Appl. No.: 08/806,433

[22] Filed: Feb. 26, 1997

[30] Foreign Application Priority Data

Feb. 28, 1996 [EP] European Pat. Off. ............. 96102933

[51] Int. Cl.⁷ .......................... A23L 3/341; B65D 81/20
[52] U.S. Cl. .................... 426/127; 426/130; 426/415; 428/36.6; 428/36.7; 428/347; 428/349; 428/475.8; 428/476.1
[58] Field of Search ................ 428/34.9, 35.2, 428/35.4, 475.5, 475.8, 476.1, 347, 349, 36.6, 36.7, 35.7; 206/497; 426/127, 130, 415, 418, 118, 395

[56] References Cited

U.S. PATENT DOCUMENTS

| | | | |
|---|---|---|---|
| 4,615,922 | 10/1986 | Newsome et al. | 428/35.2 |
| 4,828,915 | 5/1989 | Schroeder et al. | 428/332 |
| 4,911,979 | 3/1990 | Nishimoto et al. | 428/332 |
| 5,126,401 | 6/1992 | Chou | 525/58 |
| 5,382,470 | 1/1995 | Vicik | 428/344 |
| 5,480,690 | 1/1996 | Stenger et al. | 428/34.8 |
| 5,491,009 | 2/1996 | Bekele | 428/35.7 |
| 5,595,623 | 1/1997 | Lulham et al. | 156/244.14 |

FOREIGN PATENT DOCUMENTS 0 457 598 A2  5/1991  European Pat. Off. .
WO94/23946  10/1994  WIPO .

*Primary Examiner*—Ellis Robinson
*Assistant Examiner*—Sandra M. Nolan
*Attorney, Agent, or Firm*—Thomas C. Lagaly

[57] ABSTRACT

A multilayer, preferably heat-shrinkable, thermoplastic film for cheese packaging which comprises (a) a core barrier layer comprising a blend of from about 40 to about 85% by weight of nylon 6/12 and from about 15 to about 60% by weight of ethylene-vinyl alcohol copolymer; and (b) a heat-sealing layer comprising an ethylene-α-olefin polymer with a density ≦0.915 g/cc.

7 Claims, No Drawings

CHEESE PACKAGING FILM

The present invention relates to packaging films, and more particularly to a multilayer thermoplastic film having a combination of relatively low oxygen permeability, relatively high carbon dioxide permeability, and good sealability, particularly suitable for packaging $CO_2$ respiring foodstuffs, especially cheese.

Many packaging materials and preventive coatings are nowadays used to protect the cheese from the environment, including waxes, aluminum, coated paper, and thermoplastic films or sheets.

Storage and packaging of cheese are in fact particularly important for the shelf-life of cheese. Optimum storage conditions are selected depending on the type of cheese, the storage temperature, and the preferences of the market. There are however some basic packaging requirements that are the same for all types of cheese.

First of all oxygen should be excluded as much as possible to prevent mold growth, that is the most common cause of spoilage and rancidity; and secondly, moisture must be retained to preserve the texture and avoid weight losses.

Packaging in hermetically sealed containers in vacuum or in inert gases has shown to be the most successful packaging technology for increasing the cheese shelf-life, and thermoplastic films, particularly heat-shrinkable thermoplastic films, the most suitable packaging materials to be employed. The wrapping of a cheese with a heat-shrinkable thermoplastic film involves the shaping of the film with the product by shrinking which is usually accompanied by vacuum and a short heat application. This system has the advantage that any shape can be accommodated, providing a tight, smooth, and aesthetically appealing appearance to the wrapped product, and that oxygen is removed. When oxygen barrier thermoplastic films are employed, and efficiently sealed, oxygen is eliminated from the surface and the growth of spoilage organisms, which are aerobic, is therefore inhibited.

However films with a very low oxygen permeability typically also have a very low carbon dioxide permeability which is a disadvantage for packaging respiring articles such as cheeses, particularly hard and semi-hard cheeses. As a matter of fact carbon dioxide is produced by all living organisms, including the cheese micro-flora. Therefore, when films with a $CO_2$ transmission rate substantially lower than the cheese respiration rate are employed and hermetically sealed, the carbon dioxide that is produced is not allowed to diffuse away and it will give holes in the cheese mass or surface and/or inflation of the sealed film around the cheese product. This moving of the film surface out of contact with much of the surface of the packaged article, that is called "ballooning" of the package, is generally perceived by the average consumer as a defect in the packaging and an indication of possible spoilage.

Thus, while oxygen permeability of the packaging material should be as low as possible to keep the oxygen tension inside the wrap at a low level thus preventing mold growth, at the same time carbon dioxide permeability should be as high as possible. A favorable $CO_2/O_2$ permeability ratio is clearly even more necessary when uncured cheese is packaged and kept under conditions that allow ripening of the cheese in the package.

Polymeric films with a ratio of $CO_2$ transmission rate to $O_2$ transmission rate>1, particularly suitable for cheese packaging, have been described in EP-A-457,598 and are characterized by a core layer comprising a polyamide and outer layers comprising a blend of polypropylene homopolymer and ethylene-propylene copolymer. The free shrink at low temperatures (e.g. 80–85° C.) of these structures is however poor and this is a great disadvantage mainly considering that, in order to avoid melting of the fats on the cheese surface and yellowing of the cheese surface, the shrink temperature in cheese packaging should be kept as low as possible and in any case below 90° C. Furthermore, heat-sealing of these structures, just owing to the presence of the polypropylene skin layers, would require high temperature and long contact times. If lower temperatures are employed, the efficiency of sealing, that is clearly more important than the oxygen permeability of the film to guarantee the absence of oxygen, would be impaired.

WO-A-9423946 relates to heat-shrinkable polymeric films with a high $CO_2$ permeability and a relatively low $O_2$ permeability, particularly suitable for cheese packaging, characterized by the presence of a very thin controlling layer of a blend of nylon 6/66 copolymer and EVOH. However, the reduced thickness of the barrier layer and the use of nylon 6/66, which are the key characteristics of the structures there described, make extremely difficult to control the barrier properties of the films and keep them in line with the relevant specifications. As a matter of fact variations in the thickness of the barrier layer of $\pm 1$ $\mu$, that might occur and are normally accepted in industrial production, may lead to a dramatic change in the barrier properties of the overall structure bringing the oxygen permeability thereof above the upper acceptable limit. Furthermore the variations in oxygen and carbon dioxide permeability with relative humidity of blends of EVOH with nylon 6/66, are extremely high and do not allow a control of the barrier properties unless identical humidity conditions, during the whole curing, storage and distribution cycles, could be guaranteed, which is impossible.

SUMMARY OF THE INVENTION

It is an object of the present invention to provide a multilayer film, particularly suitable for cheese packaging, characterized by a combination of relatively low oxygen permeability, a relatively high carbon dioxide permeability and good sealability.

It is a further object of the present invention to provide a multilayer film particularly suitable for cheese packaging, characterized by a combination of relatively low oxygen permeability, a relatively high carbon dioxide permeability, good sealability, and good shrink properties at a temperature of 85° C. or less.

It is another object of the present invention to provide a multilayer film particularly suitable for cheese packaging, characterized by a combination of relatively low oxygen permeability and a relatively high carbon dioxide permeability, wherein the variation of these values of permeability over a wide range of moisture conditions is controlled.

It is another object of the present invention to provide a multilayer film characterized by a good sealability and a combination of relatively low oxygen permeability and a relatively high carbon dioxide permeability wherein the variation of said permeability over a wide range of moisture conditions is controlled, for packaging uncured cheese wherein the cheese ripens or cures in the package.

It is another object of the present invention to provide a packaged cheese with increased shelf life, obtained by packaging the cheese under vacuum or modified atmosphere, using a multilayer film according to the present invention, characterized by a combination of relatively low oxygen permeability, a relatively high carbon dioxide permeability, and good sealability.

Accordingly, the present invention provides for a multi-layer film for cheese packaging which comprises (a) a core barrier layer comprising a blend of from about 40 to about 85% by weight of nylon 6/12 and from about 15 to about 60% by weight of ethylene-vinyl alcohol polymer; and (b) a heat-sealing layer comprising an ethylene-α-olefin polymer with a density $\leq 0.915$ g/cc.

As used herein, the term "cheese packaging" is intended to refer not only to the packaging of cured cheese to be stored and/or put into the distribution cycle but also to the packaging of uncured or partially cured cheese wherein the curing step or part of it occurs under controlled conditions while the cheese is in the package. At the end of said curing process the packaged cheese may be unpacked, cut in smaller portions that are then re-packed or it can be stored and/or distributed to the consumers in the original package.

As used herein, the term "film" is used in a generic sense to include plastic web, regardless of whether it is a film or a sheet. Preferably, films of use in the present invention have a thickness of 250 $\mu$ or less, more preferably of from about 15 to about 150 $\mu$, and even more preferably of from about 20 to about 90 $\mu$.

The term "oriented" is used herein interchangeably with the term "heat-shrinkable", these terms designating a multi-layer structure which has been stretched at a temperature—indicated as the "orientation temperature"—higher than the Tg of each of the resins making up the structure and lower than the m.p. of at least one of said resins, and set by cooling while substantially retaining its stretched dimensions. "Oriented" materials can be mono-axially or biaxially oriented, depending on whether the stretching is carried out in only one direction, typically the machine or longitudinal direction (MD), or in two perpendicular directions, i.e. the machine or longitudinal direction (MD) and the transverse direction (TD). An "oriented" material will tend to return to its original unstretched (unextended) dimensions when heated to a temperature close to the orientation temperature ("heat-shrinkable"). For the purposes of the present invention "heat-shrinkable" films are those films that shrink by at least 10% of their original dimensions, in at least one of the machine and transverse directions, when heated to a temperature of 85° C. for 4 seconds. The quantitative determination of this "% Free Shrink" is carried out according to ASTM D-2732, as set forth in the 1990 Annual Book of ASTM Standards, Vol. 08.02, pp. 368–371.

As used herein, the phrases "inner layer", "internal layer", or "intermediate layer" refer to any film layer having both of its principal surfaces directly adhered to another layer of the film.

As used herein, the term "core", and the phrase "core layer" refer to any internal film layer which has a primary function other than serving as an adhesive or compatibilizer for adhering two layers to one another.

As used herein, the phrase "barrier layer", is used with reference to the ability of a film layer to substantially reduce the film permeability to gases such as oxygen and carbon dioxide. Typically, barrier layers comprise a barrier resin such as PVDC or EVOH.

As used herein, the phrase "outer layer" or "exterior layer" refers to any film layer having less than two of its principal surfaces directly adhered to another layer of the film. In multi-layer films there are two outer layers, each of which has a principal surface adhered to only one other layer of the multilayer film.

As used herein, the phrase "seal layer", "sealing layer", "heat-seal layer", and "sealant layer", refer to an exterior film layer involved in the sealing of the film to itself, another film layer of the same or another film and/or another article which is not a film.

As used herein, the term "seal" refers to any seal of a first region of a film surface to a second region of a film surface, wherein the seal is formed by heating the regions to at least their respective seal initiation temperatures. The heating can be performed by anyone or more of a wide variety of manners, such as using a heated bar, hot air, infrared radiation, etc.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer to the two other layers it is between, as well as lack of direct adherence to either or both of the two other layers the subject layer is between, i.e., one or more additional layers can be interposed between the subject layer and one or both the layers the subject layer is between.

As used herein, the term "polymer" refers to the product of polymerization reaction, and is inclusive of homopolymers, copolymers, terpolymers, etc.

As used herein, the term "polyolefin" refers to any polymerized olefin, which can be linear, branched, cyclic, aliphatic, aromatic, substituted or unsubstituted. More specifically, included in the term "polyolefin" are homopolymers of olefin, copolymers of at least two α-olefins, copolymers of an α-olefin and a non-olefinic comonomer copolymerizable with the olefin, such as vinyl monomers, and the like. Heterogeneous and homogeneous polymers are included. Specific examples include polyethylene homopolymers, polybutene, propylene-α-olefin polymers, ethylene-α-olefin polymers, butene-α-olefin polymers, ethylene-vinyl acetate polymers, ethylene-ethyl acrylate polymers, ethylene-butyl acrylate polymers, ethylene-methyl acrylate polymers, ethylene-acrylic acid polymers, ethylene-methacrylic acid polymers, etc.

As used herein, the phrase "heterogeneous polymers" refers to polymerization reaction products of relatively wide variation in molecular weight and relatively wide variation in composition distribution. Such polymers typically contain a relatively wide variety of chain lengths and comonomer percentages.

As used herein, the phrase "homogeneous polymers" refers to polymerization reaction products of relatively narrow molecular weight distribution and relatively narrow composition distribution. Homogeneous polymers exhibit a relatively even sequencing of comonomers within a chain, the mirroring of sequence distribution in all chains, and the similarity of length of all chains.

As used herein, the phrase "ethylene-α-olefin" polymer refer to polymers formed by the polymerization of ethylene with one or more ($C_4$–$C_8$)-α-olefin, such as butene-1, hexene-1, 4-methyl-pentene-1, octene-1. It includes such heterogeneous materials as linear low density polyethylene (LLDPE), and very low and ultra low density polyethylene (VLDPE and ULDPE); and homogeneous polymers such as, for instance, Ziegler-Natta-catalyzed homogeneous polymers, e.g. TAFMER™ materials supplied by Mitsui Petrochemical, and metallocene-catalyzed homogeneous materials such as, for instance, EXACT™ materials supplied by Exxon, AFFINITY™ or ENGAGE™ resins supplied by Dow, and LUFLEXEN™ materials sold by BASF.

As used herein, the term "modified polyolefins" include modified polymers prepared by copolymerizing the homopolymer of the olefin or copolymer thereof with an unsaturated carboxylic acid, e.g., maleic acid, fumaric acid or the like, or a derivative thereof, such as the anhydride, ester or metal salt or the like, or by incorporating into the olefin homopolymer or copolymer, an unsaturated carboxylic acid, e.g., maleic acid, fumaric acid or the like, or a derivative thereof such as the anhydride, ester or metal salt or the like.

As used herein, the phrase "tie layer" refers to any internal layer having the primary purpose of adhering two layers to one another. Tie layers generally comprise a non-polar or slightly polar polymer having a polar group grafted thereon; preferably, tie layers comprise at least one member selected from the group consisting of polyolefin and modified polyolefin, e.g. ethylene-vinyl acetate polymer, modified ethylene-vinyl acetate polymer, ethylene polymers, modified ethylene polymers, heterogeneous or homogeneous ethylene-$\alpha$-olefin polymers and modified heterogeneous or homogeneous ethylene-$\alpha$-olefin polymers; more preferably tie layers comprise at least one member selected from the group consisting of anhydride grafted linear low density polyethylene, anhydride grafted low density polyethylene, homogeneous ethylene-$\alpha$-olefin polymer, and anhydride grafted ethylene-vinyl acetate polymers.

The % by weight of nylon 6/12 in the blend of the core barrier layer is—as indicated above—comprised between about 40 and about 85 and—as a complement to 100%—that of ethylene-vinyl alcohol copolymer between about 15 and about 60. By decreasing the amount of nylon 6/12 and increasing the amount of ethylene-vinyl alcohol copolymer the gas permeability will decrease and vice-versa. It is therefore possible, by varying the proportions of the two components in the blend within the above given range, to obtain the most suitable permeability for each specific type of cheese. More particularly, for high gassing cheese a higher % of nylon 6/12 will be preferred, while for low gassing cheese a lower % of nylon 6/12 and a higher % of ethylene-vinyl alcohol copolymer will be chosen.

Preferably, however, the % of nylon 6/12 in the blend of the core barrier layer will be comprised between about 50 and about 80, and even more preferably, particularly with medium gassing cheeses, it will be comprised between about 55 and about 75.

The ethylene-vinyl alcohol component of the core barrier layer may have an ethylene content of from about 20 to about 60 mole %. Preferably, balancing the gas barrier properties with the moisture barrier ones and the resin stretchability, polymers with an ethylene content of from 40 to 50 mole %, and more preferably of from about 42 to about 48 mole %, are employed. Said polymers are commercially available and are generally prepared by saponification of the corresponding ethylene-vinyl acetate polymers.

The nylon 6/12 component of the core blend is a copolyamide based on $\epsilon$-caprolactam and laurolactam that may contain the two comonomers in different proportions. Preferred mass ratios between the two forming comonomers in the end copolyamide ($\epsilon$-caprolactam: laurolactam) are of from about 15:85 to about 85:15, while more preferred mass ratios are comprised between about 20:80 and about 60:40.

In the films according to the present invention, the core barrier layer has a thickness generally comprised between about 3 and about 10 $\mu$, and preferably comprised between about 4 and about 8 $\mu$. Thinner barrier layers might be employed still providing for the desired $CO_2/O_2$ permeability ratio. However with barrier layers thicker than 3 $\mu$, possible variations of the partial thickness in the industrial manufacture of the multi-layer structure less affect the barrier properties of the overall structure.

In a preferred embodiment of the present invention, the core barrier layer (a) essentially consists of such a blend, wherein the term "essentially consists" is used to indicate that, in addition to nylon 6/12 and ethylene-vinyl alcohol copolymer, the barrier layer (a) may include small amounts (e.g., up to 15% by weight, preferably up to 10% by weight, and even more preferably up to 5% by weight) of other materials, such as other polymers, processing aids, antioxidants, fillers, pigments, compatibilizers, etc., provided the addition of these materials does not change the essence of the invention.

No other barrier layers, and in particular no other EVOH comprising layers, are present in the film according to the present invention as this would lead to a drastic reduction in permeability of the film that would be unsuitable for cheese packaging.

The ethylene-$\alpha$-olefin polymer for the heat-sealing layer may be a heterogeneous or homogeneous ethylene-$\alpha$-olefin polymer as defined above, having a density of $\leq 0.915$ g/cc. Preferably, however, the density of said ethylene-$\alpha$-olefin polymer, particularly when the resin is employed in the heat-sealing layer either alone or blended with a small amount of another resin compatible therewith, is comprised between 0.890 and 0.915 g/cc. More preferably said density is comprised between 0.895 and 0.912 g/cc.

Density is measured by standard method ASTM D-792.

Preferably the heat-sealing layer comprises at least 50% by weight of ethylene-$\alpha$-olefin polymer with a density $\leq 0.915$ g/cc. Even more preferably said heat-sealing layer will comprise at least 70% by weight of ethylene-$\alpha$-olefin polymer with a density $\leq 0.915$ g/cc. In a most preferred embodiment said heat-sealing layer essentially consists of ethylene-$\alpha$-olefin polymer with a density $\leq 0.915$ g/cc.

The thickness of the heat-sealing layer will depend on the overall thickness of the end structure and on the number of layers contained therein. For an overall thickness range of from 15 to 30 $\mu$, the thickness of the heat-sealing layer will typically be from about 3 to about 8 $\mu$; for an overall thickness of from 30 to 60 $\mu$, the thickness of the heat-sealing layer is generally $\geq 6 \mu$, typically comprised between about 6 and about 20 $\mu$, preferably between about 8 and about 16 $\mu$; for an overall thickness higher than 60 $\mu$, the thickness of the heat-sealing layer is generally $\geq 10 \mu$, typically between about 12 and about 30 $\mu$.

At least another outer layer is required in the overall structure, said other outer layer being employed as the abuse resistance layer. This can be made, as known in the art, from a single resin or a blend of resins selected to provide the overall structure with the desired puncture, wear, and abuse resistance characteristics. Typical resins that can be used in the outer abuse resistance layer are e.g. polyolefins as defined above, and preferably ethylene-vinyl acetate polymers, ethylene-alkyl acrylate or methacrylate polymers, ethylene homo-polymers, ethylene-$\alpha$-olefin polymers, etc.

One or two tie layers may be added to increase adhesion between the core barrier layer (a) and the outer layers.

Additional intermediate layers can also be included in the overall structure to improve the structure mechanical properties, and additional tie layers may be included to improve adhesion between the different layers.

The maximum number of layers in the structure according to the present invention will only depend on the equipment available for the manufacture thereof. While up to 10 layers in the overall structure can be easily devised on the basis of the commonly available manufacturing lines, in practice structures with up to 7, 8, or 9 layers will be preferred.

Thermoplastic resins which can suitably be employed in these optional, additional, layers comprise, for example, polyolefins, and in particular heterogeneous ethylene-α-olefin polymers, homogeneous ethylene-α-olefin polymers, ethylene-vinyl acetate polymers, ethylene-(meth)acrylic acid polymers, ethylene-alkyl(meth)acrylate polymers, ionomers, modified polyolefins, and blends thereof.

The resins used in the manufacture of the films according to the present invention can be suitably additives as known in the art in order to improve the properties of the film or the manufacturing properties thereof As an example the resins may contain stabilizers, anti-oxidants, pigments, U.V. absorbers, etc. In particular the outer layers may comprise slip and anti-blocking agents as conventionally used in this field.

The films according to the present invention can be manufactured by the so-called trapped-bubble process, which is a known process typically used for the manufacture of heat-shrinkable films to be used for food-contact packaging.

According to said process, the multi-layer film is coextruded through a round die to obtain a tube of molten polymer which is quenched immediately after extrusion without being expanded, optionally cross-linked, then heated to a temperature which is below the melting temperature of at least one of the resins employed, typically by passing it through a hot water bath, and expanded, still at this temperature by internal air pressure to get the transversal orientation and by a differential speed of the pinch rolls which hold the thus obtained "trapped bubble" to provide the longitudinal orientation. The film is then rapidly cooled to somehow freeze the molecules of the film in their oriented state and wound.

Alternatively the flat cast technology followed by orientation via tenterframe, sequential or simultaneous, may be employed for the manufacture of the film of the present invention.

Depending on the number of layers in the structure it may be advisable or necessary to split the coextrusion step: a tube will first be formed of a limited number of layers; this tube will be quenched quickly and before submitting it to the orientation step it will be extrusion coated with the remaining layers, again quenched quickly, optionally cross-linked, and then passed to the orientation. During the extrusion coating the tube will be slightly inflated just to keep it in the form of a tube and avoid that it collapses.

The coating step can be simultaneous, by coextruding all the remaining layers altogether, so as to simultaneously adhere all of them, one over the other, to the quenched tube obtained in the first (co)extrusion step, or this coating step can be repeated as many times as the layers which are to be added.

In a preferred embodiment of the present invention the film is partially or wholly cross-linked. In particular according to a preferred embodiment of the present invention at least the heat-sealing layer is cross-linked. To produce cross-linking an extrudate is treated with a suitable radiation dosage of high energy electrons, preferably using an electron accelerator, with the dosage level being determined by standard dosimetry methods. Other accelerators such as a Van der Graaf generator or resonating transformer may be used. The radiation is not limited to electrons from an accelerator since any ionizing radiation may be used. Radiation dosages are referred to herein in terms of megarad (Mrad). A Mrad is $10^6$ Rad, with a Rad being the quantity of irradiation that results in the absorption of 100 ergs of energy per gram of irradiated material regardless of the source of radiation. A suitable radiation dosage of high energy electrons is up to about 14 Mrad, more preferably in the range of from about 2 to about 12 and even more preferably in the range of from about 3 to about 8 Mrad.

Irradiation is most preferably performed prior to orientation but it could also be performed after orientation.

Extrusion coating is a suitable technique also when a film only partially cross-linked is desired. As an example, in the preferred embodiment that has been indicated above, wherein the heat-sealing layer is cross-linked, while cross-linking of the other layers might be of no benefit, instead of cross-linking the overall structure it might be convenient to extrude the heat-sealing layer, or coextrude the heat-sealing layer together with one or more of the layers adjacent thereto in the overall structure, cross-link this first tube, extrusion-coat it with the other layer(s) of the overall structure and finally orient the complete, partially cross-linked tube.

The film of the present invention may be used either as a film or as a bag to form a package in a conventional manner. In a preferred embodiment the film is obtained as a tubular film and bags are formed by transverse sealing and cutting across the flattened tubular film. Alternatively bags can be made by slitting the tubular film along one edge and then transversely sealing and severing the film to produce bags: Other methods of making bags and packages are known and may be readily adapted to use with the multilayer film of the invention.

The film of the invention is particularly suitable for packaging $CO_2$ respiring foods and particularly cheese.

EXAMPLE 1

A 54-$\mu$ thick 9-layer structure having general formula A/B/C/D/E/F/G/H/I, wherein the resins employed for each layer and the thickness thereof in the end product are reported in Table 1 below, has been prepared by coextrusion of the first four layers A/B/C/D, irradiation at 4.5 MRad, extrusion coating with the remaining five layers E/F/G/H/I, and biaxial orientation of the obtained tube at 90–93° C. (stretching ratios 3.60×3.65).

MI's have been evaluated by ASTM D-1238 Condition E (190° C., 2.160 kg).

TABLE 1

| Layer | Composition | Thickness ($\mu$) |
|---|---|---|
| A | Heterogeneous ethylene-octene polymer (d = 0.911 g/cc - MI = 6.6 g/10') Stamylex ™ 08-076F (DSM) | 10 |
| B | Ethylene-vinyl acetate polymer (13% VA - MI = 0.25 g/10') Escorene ™ Ultra UL00014 (Exxon) | 6 |
| C | Ethylene-methacrylic acid polymer (12% MA - MI 1.5 g/10') Nucrel ™ 1202 HC (DuPont) | 9 |
| D | Ethylene-vinyl acetate polymer (13% VA - MI = 0.25 g/10') Escorene ™ Ultra UL00014 (Exxon) | 6 |
| E | Ethylene-vinyl acetate polymer (9% VA - MI = 3.0 g/10') Evatane ™ 1020 VN3 (Elf Atochem) | 5 |
| F | Ethylene-vinyl acetate based adhesive with ethylene-propylene-diene rubber Bynel ™ CXA 3062 (DuPont) | 4 |
| G | Blend of 70 weight % of nylon 6/12 (40% ε-caprolactam and 60% laurolactam) Grilon ™ CA 6E (EMS), and 30% of ethylene-vinyl alcohol polymer | 5 |

TABLE 1-continued

| Layer | Composition | Thickness ($\mu$) |
|---|---|---|
| | (44 mole % of ethylene - MI = 5.5 g/10') EVAL ™ EP-E105A (Marubeni) | |
| H | Ethylene-vinyl acetate based adhesive with ethylene-propylene-diene rubber Bynel ™ CXA 3062 (DuPont) | 4 |
| I | Ethylene-vinyl acetate polymer (9% VA - MI = 3.0 g/10') Evatane ™ 1020 VN3 (Elf Atochem) | 5 |

Comparative Example 1

By following essentially the same procedure described in Example 1 but replacing the nylon 6/12 in the barrier blend of layer G with a nylon 6/66 (Ultramid™ C 35—Naturin) a comparative 9-layer structure has been obtained.

Tests carried out on a Braebender (an experimental small scale extruder) showed that while the blend of layer G of Example 1 could be extruded at 170° C. with no gel formation, the blend comprising a nylon 6/66 used in this Comparative Experiment 1 had to be extruded at much higher temperatures since at 190° C. it still contained unmelted particles. Therefore layer G was extruded at a temperature of 190° C. in Example 1 and at a temperature of 224° C. in this Comparative Example 1.

The extrusion temperatures of all the other layers were identical in both Example 1 and Comparative Example 1.

Owing to the lower stretchability of nylon 6/66, furthermore, it was not possible to orient the bubble with stretching ratios of 3.60×3.65 as in Example 1, but the stretching ratios had to be reduced to 3.05×3.55. The end structure was therefore slightly thicker than that of Example 1. In particular the nominal thickness for the barrier layer G in this Comparative Example 1 was 6 $\mu$ instead of 5 $\mu$.

The $O_2$ permeability of the structure of Example 1 and of that of Comparative Example 1 has been evaluated at 23° C. and 0 and 100% Relative Humidity (R.H.), according to standard method ASTM D-3985.

At 100% R.H., the sandwich method, wherein both sides of the specimens to be tested are in contact with water, was applied and the test was performed after 4 days of conditioning.

The $CO_2$ permeability of the structure of Example 1 and of that of Comparative Example 1 also has been evaluated at 23° C. and 0 and 100% R.H. by means of a Permatran C-IV infrared sensor and recorder marketed by Mocon Testing—U.S.A. Shortly, specimens of the films to be tested are clamped in a diffusion cell, where the upper part is then filled with $CO_2$ (100%) and the lower part with a nitrogen carrier. The trapped nitrogen carrier is then circulated in a closed loop within the cell by means of a suitable pump. The increase in $CO_2$ concentration in the nitrogen gas is continuously recorded by an infrared sensor. As in the determination of the $O_2$ permeability, also in this case the sandwich method is employed for the tests simulating 100% R.H.. In this case however the gases were not humidified.

The results of these tests are reported in Table 2 below.

The permeability values are expressed as cc/daysqm bar.

"$O_2$ ratio" and "$CO_2$ ratio" are the abbreviated forms for "$O_{2\ 100\%}/O_{2\ 0\%}$ ratio" and "$C_{2\ 100\%}/CO_{2\ 0\%}$ ratio" and represent the ratio between the permeability at 100% R.H. and that at 0% R.H. for $O_2$ and $CO_2$ respectively.

TABLE 2

| Structure | Average thickness of barrier layer ($\mu$) | $O_2$ permeability 0% R.H. | $O_2$ permeability 100% R.H. | $O_2$ ratio | $CO_2$ permeability 0% R.H. | $CO_2$ permeability 100% R.H. | $CO_2$ ratio |
|---|---|---|---|---|---|---|---|
| Ex. 1 | 5.0 (4.6–5.4) | 191 | 345 | 1.8 | 890 | 2570 | 2.9 |
| Comp. Ex. 1 | 6.8 (6.4–7.2) | 56 | 373 | 6.7 | 230 | 3039 | 13.2 |

The data reported in Table 2 above show that the use of nylon 6/12 in the barrier blend provides for a better control of the barrier properties of the film as the variations of $O_2$ and $CO_2$ permeability with the relative humidity are much less relevant than with nylon 6/66.

Furthermore it appears that, when the barrier blend comprises nylon 6/12, good barrier properties can be obtained also with thinner barrier layers.

The free shrink of the above structures was also tested, at 85° C. by ASTM Method D-2732 and the results are reported in Table 3 below:

TABLE 3

| Structure | Average % free shrink LD | Average % free shrink TD |
|---|---|---|
| Film of Example I | 33 | 41 |
| Comparative Example I | 32 | 36 |

Examples 2 and 3

The films of examples 2 and 3 are obtained by following the same procedure as in Example 1 with the only difference that the ratio between Grilon CA 6E and EVAL EP-E105A in the blend of the barrier layer G is 50/50 in Example 2 and 85115 in Example 3. The obtained films have the permeability at 100% R. H. reported in Table 4 below:

TABLE 4

| Structure | Average thickness of barrier layer ($\mu$) | $O_2$ permeability 0% R.H. | $O_2$ permeability 100% R.H. | $O_2$ ratio | $CO_2$ permeability 0% R.H. | $CO_2$ permeability 100% R.H. | $CO_2$ ratio |
|---|---|---|---|---|---|---|---|
| Ex. 2 | 4.7 (4.2–4.9) | 82 | 264 | 3.2 | 327 | 1910 | 5.8 |
| Ex. 3 | 4.3 (4.1–4.5) | 571 | 550 | 0.96 | 2739 | 3281 | 1.2 |

Examples 4 and 5

The films of examples 4 and 5 are obtained by following the same procedure as in the preceding Examples 1 to 3 with the only difference that the ratio between Grilon™ CA 6E and EVAL™ EP-E105A in the blend of the barrier layer G is 60/40 in Example 4 and 80/20 in Example 5. Films with intermediate permeability are thus obtained.

Examples 6 and 7

5-layer symmetrical films having the general structure A/B/C/B/A wherein layer C (6 μ thick) has the same composition as layer G in Example 1, and the composition and thickness of layers A and B are as indicated in Table 5 below, are obtained by cast co-extrusion through a round die, followed by quick quenching of the primary tape by means of a water cascade, irradiation of the tape to about 4.0 MRad, heating of the primary tape to about 90–92° C. and biaxial orientation by the trapped bubble method (3.5×3.6 stretching ratio).

TABLE 5

| Ex. No. | A | B |
|---|---|---|
| 6 | blend of 50% EVA (6% VA - MI = 2.5 g/10' - Escorene ™ UL00206 - Exxon) and 50% of heterogeneous ethylene-octene polymer (d = 0.911 g/cc - MI = 6.6 g/10' - Stamylex ™ 08-076F - DSM) (14μ). | Acrylate modified EVA (18% VA)-based tie layer (MI = 2.7 g/10')-Bynel ™ 3101 - DuPont (4μ) |
| 7 | blend of 30% EVA (6% VA - MI = 2.5 g/10' - Escorene ™ UL00206 - Exxon) and 70% of heterogeneous ethylene-octene polymer (d = 0.911 g/cc - MI = 6.6 g/10' - Stamylex ™ 08-076F - DSM) (16μ). | Acrylate modified EVA (18% VA)-based tie layer (MI = 2.7 g/10')-Bynel ™ 3101 - DuPont (5μ) |

Examples 8 and 9

5-layer asymmetrical films having the general structure A/B/C/B/D wherein layer C (6 μ thick) has the same composition as layer G in Example 1, and the composition and thickness of layers A, B, and D are as indicated in Table 6 below, are obtained by cast co-extrusion through a round die, followed by quick quenching of the primary tape by means of a water cascade, irradiation of the tape to about 5.5 MRad, heating of the primary tape to about 90–92° C. and biaxial orientation by the trapped bubble method (3.5×3.5).

TABLE 6

| Ex. No. | A (sealing layer) | B | D |
|---|---|---|---|
| 8 | heterogeneous ethylene-octene polymer (d = 0.911 g/cc - MI = 6.6 g/10' - Stamylex ™ 08-076F - DSM) (14μ). | acrylate modified EVA 18% VA)-based tie layer (MI = 2.7 g/10') - Bynel ™ 3101 - DuPont (4μ) | blend of 50% EVA (6% VA - MI = 2.5 g/10') - Escorene ™ UL 00206-Exxon and 50% of heterogeneous ethylene-octene polymer (d = 0.920 g/cc - MI = 1.0 g/10') - Dowlex ™ 2045E - Dow (16μ) |
| 9 | heterogeneous ethylene-octene polymer (d = 0.911 g/cc - MI = 6.6 g/10' - Stamylex ™ 08-076F - DSM)(14μ). | acrylate modified EVA 18% VA)-based tie layer (MI = 2.7 g/10') - Bynel ™ 3101 - DuPont (4μ) | blend of 50% EVA (6% VA - MI = 2.5 g/10') - Escorene ™ UL 00206-Exxon,25% of heterogeneous ethylene-octene polymer (d = 0.920 g/cc - MI = 1.0 g/10')-Dowlex ™ 2045E Dow and 25% Stamylex ™ 08-076F DSM (18μ) |

Examples 10 and 11

The films of Examples 10 and 11 are obtained by following the procedure of Example 1 with the only difference that Stamylex™ 08-076F in the sealing layer A has been replaced by the resins reported in Table 6 below:

TABLE 6

| Example no | layer A |
|---|---|
| 10 | Long chain branched homogeneous ethylene-octene-1 polymer (d = 0.908 g/cc, MI = 1 g/10' - AFFINITY ™ PL1840 - Dow) |
| 11 | Linear homogeneous ethylene-hexene-1 polymer (d = 0.910 g/cc, MI = 1 g/10' - EXACT ™ 3029 - Exxon) |

Example 12

A 45-μ thick 7-layer structure having general formula A/B/C/D/E/F/G, wherein the resins employed for each layer and the thickness thereof in the end product are reported in Table 7 below, is prepared by coextrusion of the first two layers A/B, irradiation at 3.5 MRad, extrusion coating with the remaining five layers C/D/E/F/G, and biaxial orientation of the obtained tube at 90–93° C. (stretching ratios 3.5×3.5).

TABLE 7

| Layer | Composition | Thickness (μ) |
|---|---|---|
| A | Heterogeneous ethylene-octene polymer (d = 0.911 g/cc - MI = 6.6 g/10') Stamylex ™ 08-076F (DSM) | 10 |
| B | Ethylene-vinyl acetate polymer (13% VA - MI = 0.25 g/10') Escorene ™ Ultra UL00014 (Exxon) | 14 |
| C | Ethylene-vinyl acetate polymer (9% VA - MI = 3.0 g/10') Evatane ™ 1020 VN3 (Elf Atochem) | 4 |
| D | Ethylene-vinyl acetate based adhesive with ethylene-propylene-diene rubber Bynel ™ CXA 3062 (DuPont) | 4 |
| E | Blend of 70 weight % of nylon 6/12 (40% ε-caprolactam and 60% laurolactam) Grilon ™ CA 6E (EMS), and 30% of ethylene-vinyl alcohol polymer (44 mole % of ethylene - MI = 5.5 g/10') | 5 |

TABLE 7-continued

| Layer | Composition | Thickness ($\mu$) |
|---|---|---|
|   | EVAL ™ EP-E105A (Marubeni) |   |
| F | Ethylene-vinyl acetate based adhesive with ethylene-propylene-diene rubber Bynel ™ CXA 3062 (DuPont) | 4 |
| G | Ethylene-vinyl acetate polymer (9% VA - MI = 3.0 g/10') Evatane ™ 1020 VN3 (Elf Atochem) | 4 |

Example 13

A 43-$\mu$ thick 6-layer asymmetrical film having the general structure A/B/C/D/C/E wherein the composition and thickness of layers A, B, C, D and E is as indicated in Table 8 below, is obtained by cast coextrusion through a round die, followed by quick quenching of the primary tape by means of a water cascade, irradiation of the tape to about 5.0 MRad, heating of the primary tape to about 90–92° C. and biaxial orientation by the trapped bubble method (3.5×3.5 stretching ratio).

TABLE 8

| Layer | Composition | Thickness ($\mu$) |
|---|---|---|
| A | Heterogeneous ethylene-octene polymer (d = 0.911 g/cc - MI = 6.6 g/10') Stamylex ™ 08-076F (DSM) | 10 |
| B | Ethylene-vinyl acetate polymer (13% VA - MI = 0.25 g/10') Escorene ™ Ultra UL00014 (Exxon) | 10 |
| C | Ethylene-vinyl acetate based adhesive with ethylene-propylene-diene rubber Bynel ™ CXA 3062 (DuPont) | 4 |
| D | Blend of 80 weight % of nylon 6/12 (40% $\epsilon$-caprolactam and 60% laurolactam) Grilon ™ CA 6E (EMS), and 20% of ethylene-vinyl alcohol polymer (44 mole % of ethylene - MI = 5.5 g/10') EVAL ™ EP-E105A (Marubeni) | 5 |
| E | Ethylene-vinyl acetate based adhesive with ethylene-propylene-diene rubber Bynel ™ CXA 3062 (DuPont) | 4 |
| F | Ethylene-vinyl acetate polymer (13% VA - MI = 0.25 g/10') Escorene ™ Ultra UL00014 (Exxon) | 10 |

The performances of the film of Example 1 in cheese packaging were evaluated with Edam and Minora cheeses.

With Edam cheese, 220×425 mm bags were used in the packaging. The packaged cheese was kept for 5 weeks at 12° C. for ripening. Then part of the packages were submitted to an accelerated storage (2 month at 15° C.) and part to the standard storage conditions (2 months at a temperature of 5–6° C.) prior to the evaluation. After both storage conditions, no relaxation of the film, that was still tight on the cheese, was observed. There were no craters and no holes on the cheese surface. No mold formation could be seen.

With Minora cheese (a low fat cheese with higher gassing properties) similar results were obtained.

The film of Example 2 was also tested with Edam cheese. 220×425 mm bags were used in the packaging and the packaged cheese was kept for 4 weeks at 12° C. for ripening. and then for 6 months at the standard storage conditions (5–6° C.). Also in this case the results were positive as no relaxation of the film, no craters or holes in the cheese surface and no mold formation were observed.

What is claimed is:

1. A packaged cheese product comprising a $CO_2$ respiring cheese product encased in a multilayer thermoplastic film which comprises:
    (a) a core barrier layer consisting essentially of a blend of from about 50 to about 80% by weight of nylon 6/12 and from about 20 to about 50% by weight of ethylene-vinyl alcohol copolymer; and
    (b) a heat-sealing layer comprising an ethylene-$\alpha$-olefin polymer with a density $\leq 0.915$ g/cc,
    wherein, said multilayer thermoplastic film is heat-shrinkable and said film has a ratio of $CO_2$ permeability to $O_2$ permeability greater than 1.

2. The package of claim 1 wherein the core barrier layer (a) comprises a blend of from about 55 to about 75% by weight of nylon 6/12 and from about 25 to about 45% by weight of ethylene-vinyl alcohol copolymer.

3. The package of claim 1 wherein the mass ratio between the two forming comonomers in the nylon 6/12 of core barrier layer (a) is of from about 15:85 to about 85:15.

4. The package of claim 3 wherein the mass ratio between the two forming comonomers in the nylon 6/12 of core barrier layer (a) is of from about 20:80 to about 60:40.

5. The package claim 4 wherein the heat-sealing layer (b) comprises an ethylene-$\alpha$-olefin polymer with a density of from about 0.890 g/cc to about 0.915 g/cc.

6. The package of claim 5 wherein the ethylene-$\alpha$-olefin polymer of the heat-sealing layer (b) has a density of from about 0.895 g/cc to about 0.912 g/cc.

7. The package of claim 1, wherein said ratio of $CO_2$ permeability to $O_2$ permeability is greater than 4.

* * * * *